ELECTROLUMINESCENT DEVICE

Filed July 2, 1956 3 Sheets-Sheet 1

INVENTOR
DONALD C. LIVINGSTON
BY [signature]
ATTORNEY

Feb. 17, 1959

D. C. LIVINGSTON 2,874,308

ELECTROLUMINESCENT DEVICE

Filed July 2, 1956

3 Sheets-Sheet 2

INVENTOR
DONALD C. LIVINGSTON
BY
ATTORNEY

Feb. 17, 1959 D. C. LIVINGSTON 2,874,308

ELECTROLUMINESCENT DEVICE

Filed July 2, 1956 3 Sheets-Sheet 3

INVENTOR.
DONALD C. LIVINGSTON
BY Theodore Jay Jr
ATTORNEY 2,874,308

ELECTROLUMINESCENT DEVICE

Donald C. Livingston, Bayside, N. Y., assignor to Sylvania Electric Products Inc., a corporation of Massachusetts Application July 2, 1956, Serial No. 595,297

6 Claims. (Cl. 250—213)

My invention is directed toward electroluminescent image display devices.

Certain types of phosphors, when placed in an electric field, will luminesce, the intensity of the emitted light being some function of the strength of this applied field. Consequently, films or layers containing such phosphors can be used to transform electrical energy to light energy. Phosphors of this type are said to be electroluminescent.

An electroluminescent film can be interposed between first and second mutually perpendicular (for example, horizontal and vertical) arrays of parallel, separated electrical conductors to form a crossed-grid structure. In such a structure, the film is divided into small sections or "cells," each of which is situated between one horizontal conductor and one vertical conductor. It is known that applying a suitable electric potential difference between the pair of conductors associated with any given cell will cause that cell to luminesce.

Such applied potentials can be switched or commutated between different pairs of conductors to successively energize each cell in turn, thus producing an effect analogous to scanning in a cathode ray tube as used in a conventional television receiver. Therefore, it appears theoretically possible to produce a flat electroluminescent panel which can be used as a replacement for a cathode ray tube in a television receiver.

Electroluminescent panels of the type described above exhibit a spurious effect which I define as cross effect. This effect must be overcome before a commercially successful panel can be produced. Cross effect necessarily results from the switching operation in the manner described below. When a positive potential +V is applied to a selected conductor in one array and a negative potential —V is applied to a selected conductor in the other array, all other conductors being held at zero potential, a potential difference of 2 V is established between the two selected conductors, and the electroluminescent cell connected between these two conductors will luminesce. However, a potential difference of V is established between all unselected conductors in one array and the selected conductor of the other array, and the cells connected between these conductors will luminesce less brightly. Of course, no potential difference appears across the cells between the pairs of unselected horizontal and vertical conductors, and these cells will not luminesce.

Thus, a single cell is energized in the desired manner. In addition, a number of other cells are energized to a lesser degree because of side effects inherent in the crossed-grid structure and produce a spurious luminescent pattern having the shape of a cross.

In by copending application Serial No. 544,152, filed November 1, 1955, now U. S. Patent No. 2,774,813, I disclosed a technique for eliminating the cross effect in electroluminescent devices of the crossed-grid type by preventing current flow through all cells other than the particular cell intended to be energized.

However, in the present state of the art, the light output of evry cross-grid structure, regardless of the presence or absence of cross effect, is inferior as compared to the light output of a cathode ray tube.

Attempts have been made to increase the light output of an electroluminescent cell in the following manner: Two opposed surfaces of an electroluminescent phosphor layer were each coated with a transparent electrically conductive film. A photoconductive layer was then applied over one of these films. The surface of the photoconductive layer remote from the phosphor film was then coated with an opaque electrically conductive backing film. The resulting cell thus contained electroluminescent and photoconductive elements electrically connected together in series.

The electrical characteristics of the photoconductive and electroluminescent elements were chosen so that the dark resistance of the photoconductive element would be high relative to the impedance of the electroluminescent element. Therefore, when a voltage pulse was applied across the series combination of the two elements, and the photo-conductive element was not illuminated, the resultant potential drop across the photoconductive element was much larger than that across the electroluminescent element.

It was believed that if the potential drop across the electroluminescent element, although much smaller than the drop across the photoconductive layer, was sufficient to cause luminescence, then a portion of the light emitted during luminescence would strike the photoconductive layer and its resistance would decrease. As the resistance of the photoconductive element decreased, a larger portion of the potential drop across the series combination would appear across the electroluminescent layer, and more light would be emitted therefrom. This additional light output would further decrease the resistance of the photoconductive layer, and this process would continue until the voltage pulse was no longer present. Apparently, therefore, this method would maintain the electroluminescent layer in its luminescent state for an appreciably longer period than would be possible without the use of the photoconductive layer, and hence the light output of this proposed cell would be substantially increased as compared to the output of the conventional cell.

However, it has been determined experimentally that the cell described above does not function in the manner indicated.

Ideally, the photoconductive element should be as thin as possible, since only the surface of this element adjacent the electroluminescent element is excited by the incident light; as the thickness of the photoconductive element is increased, the percentage change in its resistance, resulting from variations in incident light, decreases. On the other hand, in the above described arrangement, the dark resistance of the photoconductive element is dependent upon the thickness of this element; since the dark resistance of the photoconductive element must be relative to the impedance of the electroluminescent layer, the photoconductive element must be relatively thick. All attempts to adjust the thickness of the photoconductive element to satisfy both these conditions simultaneously have been unsuccessful. Thus, the proposed cell cannot provide the increased light output desired.

In contradistinction, in my invention an extremely thin photoconductive element of relatively high dark resistance is incorporated into an electroluminescent cell and, as a consequence, yields cells and crossed-grid structures having significantly increased light output.

Accordingly, it is an object of the present invention to increase the light output of an electroluminescent cell.

Another object is to increase the light output of electroluminescent crossed-grid structures.

Still another object is to increase the light output of an electroluminescent crossed-grid structure in which cross effect is eliminated in the manner described in the aforementioned copending application.

Yet another object is to provide a new and improved electroluminescent cell characterized by a light output substantially increased over that hitherto obtainable.

Still a further object is to provide a new and improved electroluminescent crossed-grid structure characterized in all applications by an increased light output and, in certain applications additionally characterized by the elimination of cross effect.

These and other objects of the invention will either be explained or will become apparent hereinafter.

In accordance with the principles of my invention, a photoconductive film is applied over one of the two conductive films coating opposite surfaces of an electroluminescent layer in such a manner that the entire photoconductive film can be irradiated by light emitted from the layer and yet the dark resistance of the photoconductive film can be made as high as desired.

More particularly, I provide an electroluminescent cell having the following structure:

An electroluminescent layer having two opposed surfaces is interposed between first and second electrically conductive films, each film covering a corresponding surface. The second film is transparent. A third transparent film which is electrically insulating or non-conductive, covers a major portion of the second film and leaves a minor portion of the second film exposed. A photoconductive film covers the third film and also covers the minor exposed portion of the second film. An electrically conductive electrode is secured to the photoconductive film in a position remote from the minor exposed portion of the second film. As a result, the end to end resistance along the surface of the photoconductive film (i. e., the resistance represented by the portion of the film extending between the electrode and the minor exposed portion of the second film) is electrically connected in series with the electroluminescent layer. This end to end resistance, when the photoconductive film is not irradiated by incident light, has a dark value which is high relative to the impedance of the electroluminescent layer. Further, the photoconductive film is inherently thin enough so that the entire film can be irradiated by light emitted from the electroluminescent layer.

A crossed-grid structure incorporating this type of cell can be produced by arranging a plurality of my cells in a common plane in such a manner that the cells are separated from each other and form a plurality of cell groups, each group containing the same number of cells.

The electrodes of each group are electrically interconnected to form a common conductor. The common conductors thus formed are separated from and parallel to each other and constitute a first array.

The first film of any cell in any one group is electrically interconnected with the first film of each of the corresponding cells in each of the other groups to form a single conductor. The single conductors thus formed are separated from and parallel to each other and constitute a second array.

The first array conductors are positioned at some angle other than 0° with respect to the second array conductors. For purposes of simplicity, this angle is normally chosen to be 90°, and the conductors in one array are positioned horizontally while the conductors in the other array are positioned vertically. Therefore, it is to be understood that when the terms horizontal and vertical are used hereinafter, it is not intended to restrict the structure to mutually perpendicular conductors; obviously other angular orientations can be used.

Switching or commutation means coupled between the conductors in both arrays and responsive to an incoming electrical signal are further provided to selectively energize and deenergize each of the cells in a predetermined sequential pattern.

In order to provide a crossed-grid structure in which cross effect is eliminated, I further provide a plurality of individual barrier rectifier layers or rectifiers, the number of rectifiers being equal to the number of cells. In each cell, a separate rectifier is interposed between the first array conductor and the remaining portion of said cell.

This structure is then rendered responsive to an incoming signal by switching or commutation means as described above. However, when the rectifiers are used, the switching action is accomplished by biasing the rectifier associated with the selected cell to conduct in its forward or low resistance direction, while at the same time biasing all other rectifiers in the backward or high resistance direction to such an extent that appreciably no current flows therethrough. Consequently, all cells other than the selected cell are maintained in a deenergized state, thus eliminating cross effect.

Illustrative embodiments of my invention will now be described with reference to the accompanying drawings, wherein.

Figure 1:
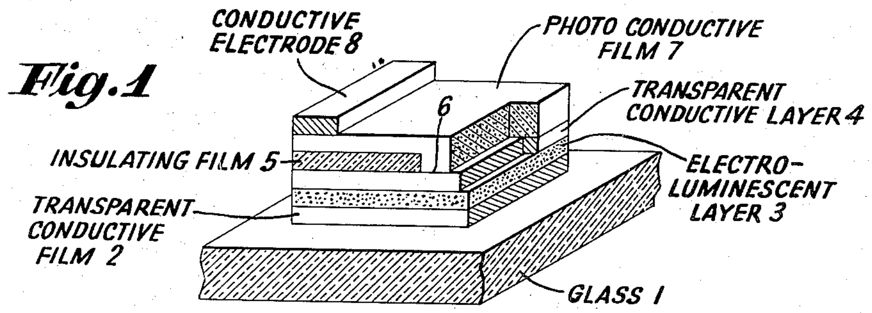
Fig. 1 shows one electroluminescent cell in accordance with my invention.

Referring now to Fig. 1, one surface of a glass plate 1 is coated with a first transparent electrically conductive film 2. An electroluminescent phosphor layer 3 is applied over the film 2. A second transparent electrically conductive film 4 is applied over the layer 3. A transparent electrically insulating third film 5 covers a major portion of the film 4, leaving a minor portion 6 of film 4 exposed. A film photoconductive film 7 covers the insulating film 5 and also covers the minor exposed portion 6 of film 4. An electrically conductive electrode 8 is secured to the film 7 on a portion remote from the minor exposed portion 6 of film 4.

The films are all composed of known materials. For example, the transparent conductive films 2 and 4 can be formed of tin oxide. The electroluminescent layer 3 can either be formed from a dielectric suspension of electroluminescent phosphors as described, for example, in the copending application Serial No. 306,909 filed August 28, 1952, by Norman L. Harvey, or can be formed from crystalline films, as described for example in U. S. Patent No. 2,685,530. The insulating film 5 can be formed from the dielectrics used in forming the above identified phosphor suspensions, and the photoconductive film 7 can be formed from cadmium sulphide. The electrode 8 can be formed from the same materials as used for the films 2, 4 or 5 or from various well known materials.

It will be apparent that the electrical resistance of the portion of the film 7 extending between the electrode 8 and the minor exposed portion 6 of film 4 is connected in series with the sandwich like structure formed by films 2 and 4 and the included layer 3; the dark resistance of the film 7 can be readily made high relative to the impedance of the layer 3. Moreover, since the film 7 is extremely thin, any light emitted by the layer 4 and passing through the insulating film 5 irradiates the entire body of film 7.

Hence, when voltage pulses are applied between film 2 and electrode 8, the initially low light output of the layer 4 irradiates the photoconductive film 7, and its resistance is decreased. As the resistance decreases, a larger portion of the voltage drop produced across the entire cell appears across the layer 4, and its light output increases. This, in turn, further reduces the resistance of film 7. This electro-optical interaction continues as long as the voltage pulse is present. When the pulse is removed, the light output of the layer 4 begins to gradually decay or decrease, and the resistance of the film gradually increases until light is no longer emitted from the phosphor layer. The decay period, however, is substantially increased as compared to the decay period of the conventional cell. The net result is that a substantial increase in total light output, as compared to conventional cells, is obtained through use of the structure shown.

Figure 2:
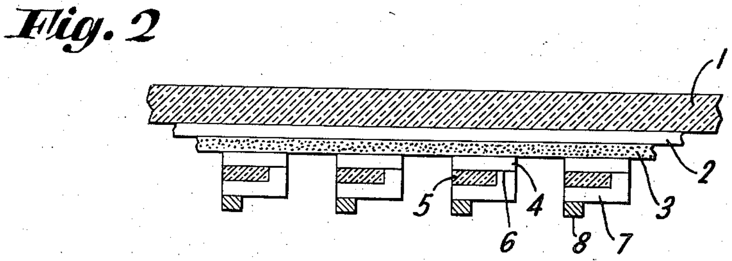
Figs. 2 and 3 are different views of one electroluminescent crossed-grid structure incorporating the cell of Fig. 1.
Figure 3:
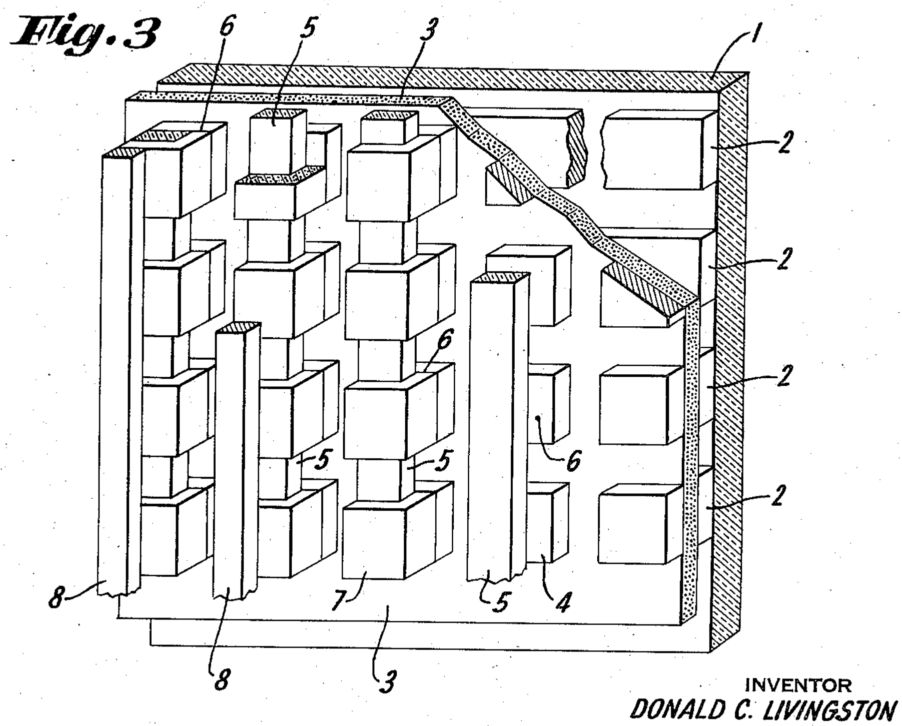

The cell of Fig. 1 can be incorporated into a crossed-grid structure as shown in Figs. 2 and 3.

One surface of a glass plate 1 is coated with a plurality of horizontal, separated, transparent, electrically conductive films or strips 2. A single electroluminescent layer 3 of the same area and shape as plate 1 is applied over the films 2. A plurality of separated, transparent, electrically conductive block-shaped films 4 arranged in columns and rows are applied over the layer 4, the number of rows being equal to the number of horizontal films 2. All of the films 4 in any row are placed in registration with the corresponding horizontal film 2.

Further, there is provided a plurality of vertical, parallel, separated, electrically insulating films 5, the number of films 5 being equal to the number of columns of films 4. Each film 5 is applied over the corresponding columns of films 4 in such manner that the left hand edge of film 5 is in registration with the left hand edge of each of the films in the column, and the right hand edge of the film approaches the right hand edge of these films but is displaced somewhat therefrom, leaving a minor portion 6 of each film 4 exposed.

I further provide a plurality of photoconductive films 7, equal in number to the number of films 4. Each photoconductive film is in registration with the corresponding film 4, each film 7 being in contact with the appropriate portion of the insulating film covering the corresponding film 4 and is further in contact with the minor portion 6 of this corresponding film.

I further provide a plurality of parallel, separated electrically conductive electrodes 8, equal in number to the number of insulating films, and parallel thereto. Each electrode is placed in contact with the minor exposed portions 6 of all of the films 4 in the corresponding column, thus forming the completed crossed-grid structure.

This structure, when operated with conventional switching or commutating means, will exhibit cross effect and will otherwise function in a known manner. Typical commutation or switching means for such a structure can be of the type described in Fig. 7 or can be of the type disclosed in the aforementioned application Serial No. 306,909.

The crossed-grid structures shown in Figs. 2 and 3, as indicated previously, will produce a substantially increased light output as compared to known structures; its operation is otherwise identical therewith.

The electrodes 8 shown in Figs. 1, 2, and 3 are quite narrow; it is often advantageous to provide a broader electrode. This can be readily accomplished as shown in Fig. 4.

Figure 4:
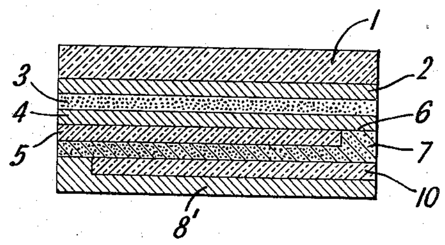
Fig. 4 shows a modified cell of the type shown in Fig. 1.

The cell of Fig. 4 comprises as before a glass plate 1, a first conductive film 2, an electroluminescent layer 3, a second conductive film 4, an insulating film 5, and a photoconductive film 7 covering the film 5 and in contact with a minor portion of film 4.

However, the cell of Fig. 4 does not utilize a narrow electrode but rather employs a relatively broad electrically conductive film 8'. Interposed between the film 8 and the photoconductive film 7 is a second electrically insulating film 10. Film 10 covers a major portion of the film 7 and leaves a minor portion 11 of film 7 exposed, the minor portion 11 being oppositely disposed from the minor portion 6 of film 4. Film 8' makes contact with the minor portion 11 of film 7 in the same manner as film 7 makes contact with the minor portion 6 of film 4.

Figure 5:
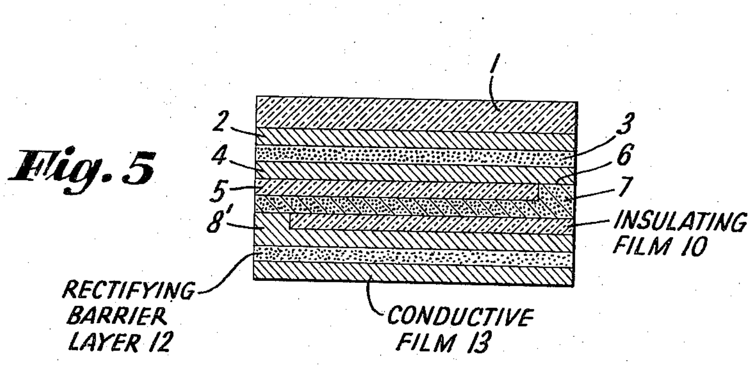
Fig. 5 shows another electroluminescent cell which incorporates a rectifier barrier layer and is otherwise similar to the cell of Fig. 1.

It will be apparent that a plurality of cells of the type shown in Fig. 5 can be arranged into columns and rows in the manner indicated in Figs. 2 and 3, with all films 8' in each column being interconnected to form a single vertical film or electrode, thus providing a plurality of relatively broad, parallel, vertical electrodes or firms. When a crossed-grid structure is formed in this manner, the second electrically insulating film 10 of Fig. 4 can be formed in the same manner as film 5 of Figs. 2 and 3.

In order to eliminate the cross effect in a crossed-grid structure, as outlined in more detail in the aforementioned copending application Serial No. 544,152 filed November 1, 1955, now U. S. Patent No. 2,774,813, a rectifying barrier layer is utilized in conjunction with each electroluminescent cell.

Fig. 5 shows a cell incorporating such a layer. The cell of Fig. 5 utilizes the structure of Fig. 4 and further includes a rectifying barrier layer 12 covering film 8' and a fourth electrically conductive film 13 covering the layer 12.

Figure 6:
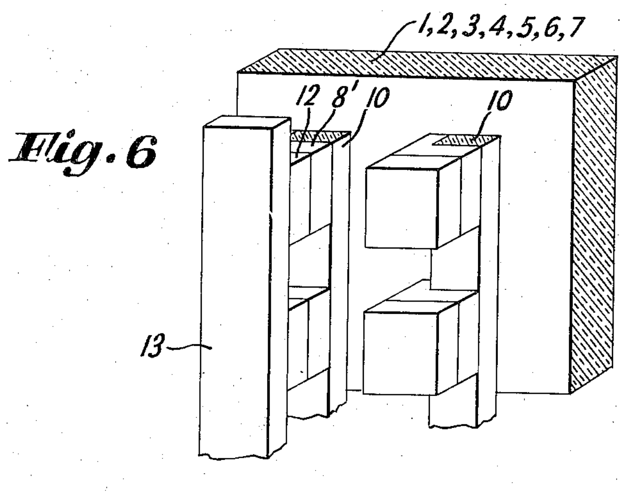
Fig. 6 shows a crossed-grid structure incorporating the cell of Fig. 5.

Fig. 6 shows a crossed-grid structure incorporating a plurality of cells of the type shown in Fig. 5. This structure has the same advantageous light output as the structure of Figs. 2 and 3 and has the further advantage of eliminating cross effect in the manner taught in the above-identified copending patent application.

Figure 7:
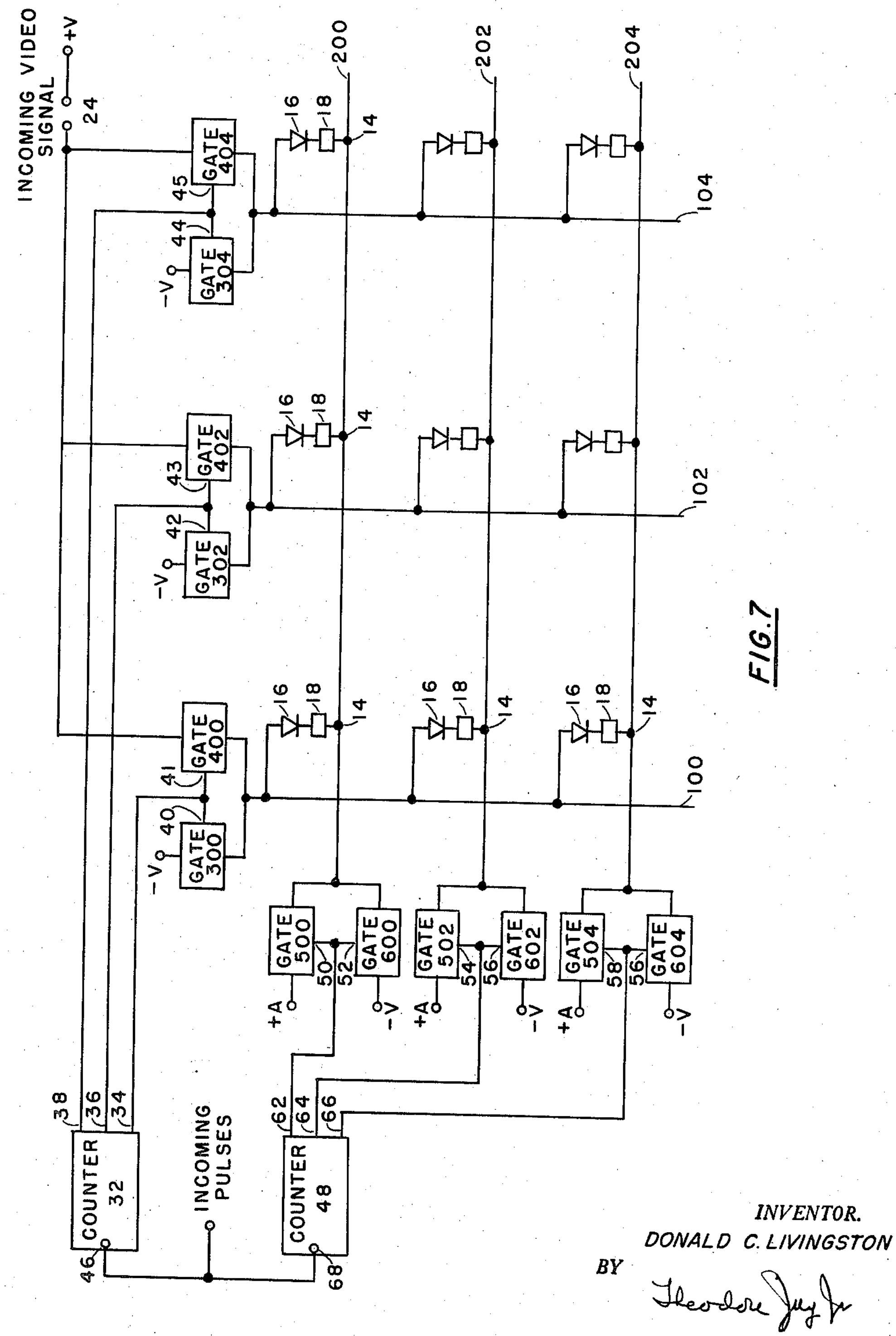
Fig. 7 is a schematic diagram showing the electrical interconnections between the structure of Fig. 6 and associated circuitry.

Fig. 7 illustrates schematically the crossed-grid structure of Fig. 6 and associated switching or commutation circuitry.

Referring now to Fig. 7, there is provided a plurality of parallel, separated, vertical electrical conductors 100, 102, 104 (in this example, three conductors) which form the first array, and a plurality of parallel, separated, horizontal electrical conductors 200, 202, 204 which form the second array.

Each vertical conductor 100, 102, 104 crosses over each horizontal conductor 200, 202, and 204 to form cross-over points 14. A circuit including in series connection a rectifying element 16 and a remaining portion of an electro-luminescent cell 18 of the type shown in Fig. 5 is connected at each cross-over point between the horizontal vertical conductor pair which defines this cross-over point.

All vertical conductors 100, 102 and 104 are connected through corresponding normally open gates 300, 302 and 304 to a point of negative potential, for example −V, and through corresponding normally closed gates 400, 402 and 404 and terminals 24 to a point of positive potential, for example +V. (All potentials are taken with reference to some arbitrary reference potential, as, for example, ground or O.)

All horizontal conductors 200, 202, 204 are connected through corresponding normally open gates 500, 502, 504 to a point of positive potential, for example +A, and through corresponding normally closed gates 600, 602 and 604 to a point of negative potential −V. Rectifying elements 16 are poled in such a manner that when the normally open gates associated with any selected pair of horizontal and vertical conductors are open, the element connected therebetween is back-biased and will not conduct appreciable current (or indeed can be completely non-conductive).

A positive going video signal is applied between terminals 24. As will become more apparent hereinafter, when this signal is supplied to any vertical conductor, it is superimposed upon a positive potential of +V. This positive potential is chosen to bias the element in the circuit connected to this conductor in such a manner that any arbitrarily small signal will cause the element to conduct heavily. The potential +A is chosen to exceed the sum of the potential +V and the maximum potential of the video signal to insure that all the rectifying elements will remain back-biased as the video signal increases to its maximum value.

A counter 32 is provided with a plurality of output leads (in this example three leads 34, 36, and 38, which are connected respectively to the conditioning electrodes 40—41, 42—43 and 44—45 of gates 300, 400, gates 302, 402 and gates 304, 504. This counter is controlled in accordance with incoming pulses (as, for example, the horizontal synchronization pulses carried by a television signal) which are supplied to the input 46 of the counter. Counter 32 is so constructed that upon the arrival of an incoming pulse, output pulses appear successively at leads 34, 36, and 38. Upon the appearance of an output pulse, the normally open gate which receives this pulse is closed, and the associated normally closed gate is opened . When the output pulse disappears, these gates automatically return to their normal states. The internal time constants of the couner are so arranged that in the period between successive incoming pulses, each pair of gates 300, 400, and 302, 402, etc. are successively actuated in this manner. Thus, if the incoming video signal is a conventional television signal, during any line interval, the normally closed and open gates associated with each vertical conductor are successively opened and closed, and the incoming signal is supplied to those conductors in turn. This action is the equivalent of one horizontal line-scanning operation in a conventional cathode-ray tube.

A second counter 48 has three output leads 62, 64, 66 respectively connected to the conditioning electrodes 50—52, 54—56, 58—60 of gates 500, 600, gates 502, 602, and gates 504, 604. Counter 48 is likewise controlled by the same incoming pulses supplied to counter 32. These pulses are supplied to the input 68 of counter 48. Counter 48 is so constructed that upon the arrival of one incoming pulse, an output pulse appears on lead 62; upon the arrival of the next incoming pulse, an output pulse appears on lead 64; upon the arrival of the next incoming pulse, an output pulse appears on lead 66. The operation of the gates associated with counter 48 is identical with that of the gates associated with counter 32.

However, the internal time constant of counter 48 are so chosen that upon the arrival of one incoming pulse a normally open gate is closed and a normally closed gate is opened; both gates remain in this condition until the arrival of the next incoming pulse.

Both counters are so constructed as to return to their original positions after the output pulses have appeared at all counter output leads.

The operation of the entire system then proceeds as follows.

A video signal carrying synchronizing pulses appears across terminal 24. The synchronization pulses are extracted from the signal in a conventional manner (not shown) and supplied to the inputs 46 and 68. Upon the arrival of one synchronization pulse, gate 500 is closed and gate 600 is opened. At the same time, gate 300 is closed and gate 400 is opened. The video signal superimposed upon a positive potential of +V then causes the element 16 associated with the cross-over point between conductors 100 and 200 to conduct and the associated electroluminescent cell 18 to luminesce to an extent dependent upon the magnitude of the video signal. All other diodes are heavily back-biased and cannot conduct. After a short interval determined by the internal time constants of counter 32, gates 400 and 300 return to their normal states; gate 302 is closed and gate 402 reopened. The element associated with conductors 100 and 200 is then rendered non-conductive and the diode associated with conductor 102 at 200 is rendered conductive. This process proceeds until all the cells 18 connected between conductors 100, 102, 104 and 200 have been successively energized and deenergized, and the next synchronization pulse appears.

At this point, gate 502 is opened, gate 600 is closed, gate 602 is closed and gate 600 is opened. The same process is repeated until the cells 18 connected between conductors 100, 102, 104 and 202 have been successively energized and deenergized. It will be seen that all cells can then be selectively energized in a manner analogous to the cathode ray tube scanning operation.

The counters and gates are well known components and are shown only in block form. For example, counter 48 can be a ring counter incorporating successive stages of bistable multivibrators or flip-flops, and counter 32 can incorporate successive stages of monostable multivibrators, each of which, when returning from the unstable to the stable state, triggers the next monostable circuit into the unstable state.

All of the structures of Figs. 1–6 can be produced through the use of photo-resist techniques. For example, construction of a crossed-grid structure could begin by applying to the glass surface, one of the photo-sensitive substances conventionally employed in photo-resist practice, optically exposing the surface to a light pattern such as will cause narrow horizontal strips corresponding to the spaces between the desired horizontal conducting strips to be "fixed." The substance can then be removed except in the "fixed" areas. A transparent conducting film can then be applied to the glass. Finally, removal of the "fixed" strips would leave the desired pattern of transparent conductive strips. Subsequent layers in the required geometries can be produced by a repetition of the process.

While I have shown and pointed out my invention as applied above, it will be apparent to those skilled in the art that many modifications can be made within the scope and sphere of my invention as defined in the claims which follow.

What is claimed is:

1. In combination, a first array having a first plurality of parallel, separated electric conductors extending along a first direction; a second array having a second plurality of parallel separated electric conductors extending along a second and non-parallel direction, each second-array conductor crossing over each first-array conductor to define a cross-over point thereat, whereby a third plurality of said points equal in number to the product of said first and second pluralities is formed; and a like third plurality of electroluminescent devices, each device being positioned at a corresponding cross-over point, each device including an electroluminescent layer having first and second opposed surfaces, said first surface being in contact with one of the first-array and second-array conductors defining the corresponding point in the region of said corresponding point, an electrically conductive first film covering the second surface of said layer, an electrically non-conductive second film covering a major portion of said first film and leaving a minor portion of said first film exposed, a photoconductive third film covering said second film and being in contact with said minor portion of said first film, the other of the first-array and second-array conductors defining the corresponding point being secured to said third film in the region of said corresponding point and in a position remote from said minor portion of said first film.

2. In combination, an electroluminescent layer; a transparent electrically conductive film covering one surface of said layer; a transparent electrically insulating film covering a major portion of the conducting film and leaving a minor portion of said conductive film exposed; a photoconductive film covering said insulating film and being in contact with said minor exposed portion; and an electrical connection to a minor portion of said photoconductive film, said minor portion of said photoconductive film being remote from the minor portion of said transparent conductive film.

3. In combination, an electroluminescent layer; a first transparent electrically conductive film covering one surface of said layer; a first transparent electrically insulating film covering a major portion of said first conductive film and leaving a minor portion of said first conductive film exposed; a photoconductive film covering said first insulating film and being in contact with said minor exposed portion of said first conductive film; a second electrically insulating film covering a major portion of the photoconductive film and leaving a minor portion of said photoconductive film exposed, the minor portion of said photoconductive film being remote from the minor portion of said first conductive film; and a second electrically conductive film covering said second insulating film and being in contact with the minor exposed portion of said photoconductive film.

4. The combination as set forth in claim 3 further including a barrier rectifier layer covering said second conductive film; and a third electrically conductive film covering said rectifier layer.

5. An electroluminescent image display structure comprising first and second arrays of separated electrical conductors, the conductors in the first array extending along a first direction, the conductors in the second array extending along a second and non-parallel direction, whereby a plurality of conductor pairs are formed, each pair being composed of one conductor from each array, and a like plurality of electroluminescent devices, each device being interposed and electrically connected between the conductors of the corresponding conductor pair, each device including an electroluminescent layer having two opposed surfaces, one surface being electrically connected to one of the conductors of the corresponding pair, the other surface being coated with a transparent electrically conductive film; a transparent electrically insulating film covering a major portion of the conductive film and leaving a minor portion of the conductive film exposed; and a photoconductive film covering the insulating film and being in contact with said minor exposed portion, the other conductor of the corresponding pair being electrically connected to the photoconductive film in a position remote from the minor exposed portion.

6. An electric circuit comprising an electroluminescent element including an electroluminescent layer electrically connected between first and second electrically conductive electrodes, said second electrode being transparent, and a photoconductive element including a photoconductive film, a minor portion of said film being in contact with said second electrode, the remaining portion of said film being insulatedly separated from said second electrode in such manner that all light radiation passing through the second electrode irradiates the entire photoconductive film; and a third electrode electrically connected to said film in a position remote from said minor portion whereby the resistance along the surface of the film extending between the minor portion of the film and the third electrode is in series connection with the resistance of the electroluminescent element.

References Cited in the file of this patent

UNITED STATES PATENTS

| | | |
|---|---|---|
| 2,698,915 | Piper | Jan. 4, 1955 |
| 2,774,813 | Livingston | Dec. 18, 1956 |
| 2,818,531 | Peek | Dec. 31, 1957 |

OTHER REFERENCES

Marshall, et al.: "Optical Elements for Computers," Quarterly Report No. 6, Computer Components Fellowship No. 347, Mellon Institute of Industrial Research, University of Pittsburgh, June 1952 (pages II–5 and II–7, and Figs. 2, 3, and 6 relied upon).